United States Patent
Ramirez et al.

(10) Patent No.: US 8,477,020 B2
(45) Date of Patent: Jul. 2, 2013

(54) REMOTE IGNITION, THEFT DETTERENCE, AND RECORDS KEEPING SYSTEM FOR A VEHICLE

(75) Inventors: Nick Ramirez, Englewood, FL (US); Reed W. Mapes, Bradenton Beach, FL (US)

(73) Assignee: Heistproof, LLC, Irondale, AL (US)

( * ) Notice: Subject to any disclaimer, the term of this patent is extended or adjusted under 35 U.S.C. 154(b) by 0 days.

(21) Appl. No.: 13/188,522

(22) Filed: Jul. 22, 2011

(65) Prior Publication Data

US 2011/0285521 A1    Nov. 24, 2011

Related U.S. Application Data

(63) Continuation-in-part of application No. 12/946,318, filed on Nov. 15, 2010, which is a continuation-in-part of application No. 11/937,576, filed on Nov. 9, 2007, now Pat. No. 7,834,745, which is a continuation-in-part of application No. 11/119,129, filed on Apr. 29, 2005, now abandoned.

(51) Int. Cl.
    *B60R 25/10*    (2006.01)

(52) U.S. Cl.
    USPC ..... 340/427; 340/5.61; 340/432; 340/426.19; 340/426.2; 340/539.1

(58) Field of Classification Search
    USPC .......... 340/5.62, 426.1, 425.5, 427, 5.61, 340/432, 426.19, 426.2, 435, 436, 440, 539.1, 340/539.11, 988; 307/10.2
    See application file for complete search history.

(56) References Cited

U.S. PATENT DOCUMENTS

| | | |
|---|---|---|
| 5,347,263 A | 9/1994 | Carroll et al. |
| 5,640,057 A | 6/1997 | Hirata et al. |
| 5,883,444 A | 3/1999 | Hirata et al. |
| 5,937,065 A | 8/1999 | Simon et al. |
| 6,008,722 A | 12/1999 | Hirozawa et al. |
| 6,078,252 A | 6/2000 | Kulczycki et al. |
| 6,118,379 A | 9/2000 | Kodukula et al. |
| 6,169,943 B1 | 1/2001 | Simon et al. |
| 6,323,566 B1 | 11/2001 | Meier |
| 6,378,774 B1 | 4/2002 | Emori et al. |
| 6,489,886 B2 | 12/2002 | Meier |
| 6,496,100 B1 | 12/2002 | Hiebl |
| 6,606,492 B1 | 8/2003 | Losey |
| 6,653,747 B1 | 11/2003 | Proefke et al. |
| 6,707,373 B2 | 3/2004 | Moreau |
| 6,737,955 B2 | 5/2004 | Ghabra et al. |
| 6,871,624 B2 | 3/2005 | Janisch |
| 6,898,489 B1 | 5/2005 | Hayes, Sr. |
| 7,834,745 B2 * | 11/2010 | Ramirez et al. ............ 340/427 |
| 2001/0035813 A1 | 11/2001 | Meier |
| 2002/0033752 A1 | 3/2002 | Greenwood et al. |
| 2002/0087867 A1 | 7/2002 | Oberle et al. |

(Continued)

*Primary Examiner* — Daryl Pope
(74) *Attorney, Agent, or Firm* — GrayRobinson, P.A.; Michael J. Colitz, III (57) ABSTRACT

Disclosed is a key-less ignition system for a vehicle. The system allows a user to automatically start the engine of a vehicle via a push button and a remote passive transponder. The system finds particular application in conjunction with smaller vehicles such as motorcycles. In one specific embodiment of the invention, the system is used in connection with an anti-theft device, such as a wheel lock. In yet another embodiment of the invention, the key-less ignition system is used in connection with a records management system, whereby service technicians can remotely retrieve maintenance records relating to the vehicle.

10 Claims, 5 Drawing Sheets

U.S. PATENT DOCUMENTS

| | | |
|---|---|---|
| 2003/0071717 A1 | 4/2003 | Hagl et al. |
| 2003/0137409 A1 | 7/2003 | Kikkawa et al. |
| 2004/0017281 A1 | 1/2004 | Dix |
| 2004/0046452 A1 | 3/2004 | Suyama et al. |
| 2004/0063477 A1 | 4/2004 | Konno |
| 2004/0090124 A1 | 5/2004 | Geber et al. |
| 2004/0090307 A1 | 5/2004 | Konno |
| 2004/0090308 A1 | 5/2004 | Takahashi et al. |
| 2006/0164217 A1 | 7/2006 | Bourgine De Meder |
| 2006/0187043 A1 | 8/2006 | Allen |

* cited by examiner

REMOTE IGNITION, THEFT DETTERENCE, AND RECORDS KEEPING SYSTEM FOR A VEHICLE

CROSS-REFERENCE TO RELATED APPLICATIONS

This application is a continuation-in-part of co-pending application Ser. No. 12/946,318 filed on Nov. 15, 2010 and entitled "Remote Ignition, Theft Deterrence, and Records Keeping System for a Vehicle." The '318 application, in turn, is a continuation-in-part of application Ser. No. 11/937,576 filed on Nov. 9, 2007 and entitled "Remote Ignition, Theft Deterrence, and Records Keeping System for a Vehicle." The '576 application, in turn, claims priority to and is a continuation-in-part of application Ser. No. 11/119,129 filed on Apr. 29, 2005 (now abandoned). The contents of all these prior applications are fully incorporated herein by reference.

BACKGROUND OF THE INVENTION

1. Field of the Invention

This invention relates to a system for the key-less ignition of a vehicle. More particularly, the present invention relates to a key-less ignition system that can also be use in theft deterrence and the storage of maintenance records.

2. Description of the Background Art

The prior art contains several examples of key-less entry systems. For example, U.S. Pat. No. 6,496,100 to Hiebl discloses a remote control key system having keyless entry functions and a vehicle immobilizing function in a common keyhead. The objective of the invention is to prevent the inadvertent operation of remote keyless commands.

Likewise, U.S. Pat. No. 6,606,492 to Losey discloses a keyless entry system that includes a controller that operates in one of two modes. When an authentication signal is received from a passive signaling device, the controller operates in one mode that permits more convenient access to a user. When an authentication signal is not received from the passive signaling device, the controller requires another mode of operation from a manually operable signaling device.

Although the above referenced inventions achieve their individual objectives, both suffer from drawbacks. Namely, none of the referenced inventions is directed at key-less entry system that are sized to be contained within a smaller vehicle. Moreover, none of the referenced inventions disclose a key-less entry system that is adapted to be used in connection with auxiliary systems, such as anti-theft devices and/or records keeping systems.

SUMMARY OF THE INVENTION

It is therefore one of the objectives of this invention to provide a key-less ignition system that is compact in design and which can be stored within a smaller vehicle, such as a motorcycle.

It is another objective of this invention to provide a key-less ignition system that operates in conjunction with an anti-theft device, such as a wheel lock.

It is yet another objective of this invention to provide a key-less ignition system that operates in conjunction with records keeping system, whereby maintenance records can be easily and conveniently retrieved by service personnel whereby the system can be employed as a sales tool and is further used in helping sales people build a rapport with customers.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a key-less ignition system for a vehicle. The system allows a user to automatically start the engine of a vehicle via a push button and a remote passive transponder. The system finds particular application in conjunction with smaller vehicles such as motorcycles. However, the invention also finds application in connection with vehicles, hot rods and/or heavy machinery.

In one specific embodiment of the invention, the system is used in connection with an anti-theft device, such as a wheel lock. In yet another embodiment of the invention, the key-less ignition system is used in connection with a records management system, whereby service technicians and sales people can remotely retrieve maintenance records relating to the vehicle, as well as customer information to foster a rapport between the customers and sales staff. The various components of the present invention, and the manner in which they interrelate, will be described in greater detail hereinafter.

Figure 1:
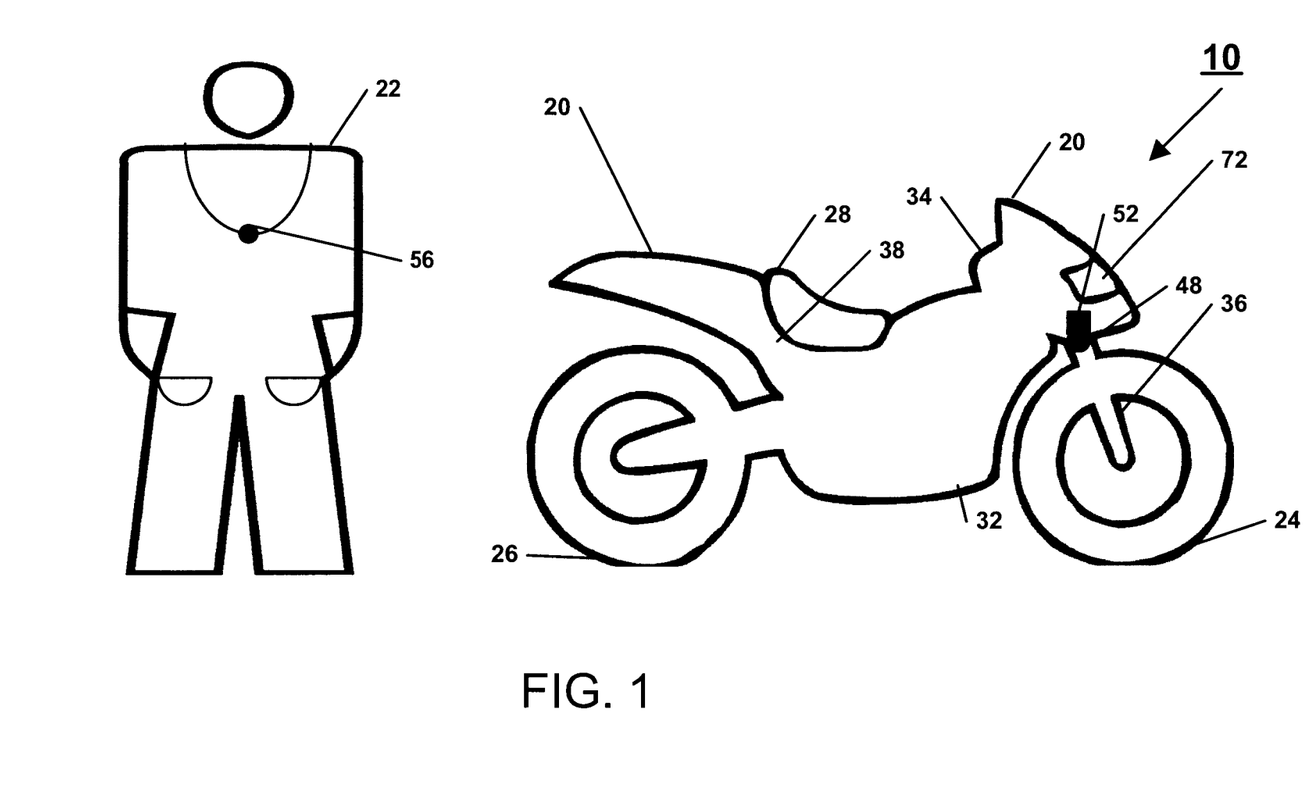
FIG. 1 is a respective view of the vehicle and operator worn transponder of the present invention.

With reference now to FIG. 1, the system 10 is illustrated in use upon a motorcycle 20. However, it should be noted that the present invention can likewise be used in connection with cars, open vehicles such as hot rods, and heavy machinery, such as backhoes and excavators. In short, the invention finds application in connection with any vehicle that is subject to theft or joyriding.

Nonetheless, the embodiment depicted in FIG. 1 is a motorcycle. As is typical, the motorcycle 20 includes a front wheel 24, a rear wheel 26, and a seat 28 therebetween. Motorcycle 20 further includes a motor 32 for powering at least one of the wheels. A pair of handlebars 34 are interconnected to front wheel 24 via a frame member 36 to enable a user to maneuver the vehicle. The various components of the key-less ignition system are adapted to be positioned with a compartment 38 located beneath seat 28. The seat is therefore pivotable to allow the user to gain access to compartment 38.

The motorcycle includes a push button starter. Namely, push button 42 (note FIG. 2) is operatively connected to an ignition 44, which in turn, activates motor 32. In accordance with the present invention, ignition 44 has both an activated state and a deactivated state. This permits push button 42 to start motor 32 only when ignition 44 is in the activated state.

With reference to FIG. 1, one example of a theft deterrence system 46 that can be used in conjunction with the present invention is illustrated. The theft deterrence system 46 depicted is a solenoid operated steering lock. The lock includes a locking bolt 48 that can be received within both an outer frame of motorcycle 20 and the adjacent wheel frame 36. Bolt 48 can be selectively extended or retracted by operation of a solenoid 52. Thus, the lock has a secured orientation wherein the locking bolt 48 is extended and rotation of the handlebars 34 and front wheel 24 is prevented. Lock further includes an unsecured orientation whereby bolt 48 is retracted and normal movement of the handlebars 34 and front wheel 24 is permitted. It is also within the scope of the present invention to employ a line lock as the theft deterrence system 46. Suitable line locks are made by B&M Products of Chatsworth, Calif.

The compartment 38 within motorcycle 20 stores the various component of the key-less ignition system. These various components are illustrated with reference to FIG. 2. One of these components is a transmitter 54. Transmitter 54 can be a Radio Frequency, Infra Red, laser or sound based transmitter. However, in the preferred embodiment an RF transmitter is utilized. Transmitter 54 is operatively interconnected to ignition 44. In use, when the push button 42 is depressed transmitter 54 sends out RF triggering signals for receipt by a nearby transponder.

As noted in FIG. 1, the preferred transponder 56 is a small operator worn transponder 56. Preferably, transponder 56 is small enough to be worn around the neck of an operator 22 or within a pocket. Transponder 56 is preferably a passive transponder that uses a parasitic power generated from the triggering signal. Upon receipt of the triggering signal, transponder 56 sends out a unique identification signal. This identification signal is preferably encoded via a Frequency Shift Keying ("FSK") or Amplitude Shift Keying ("ASK") modulation. Those skilled in the transponder arts will appreciate other modes for encoding the signal generated by transponder 56.

Figure 2:
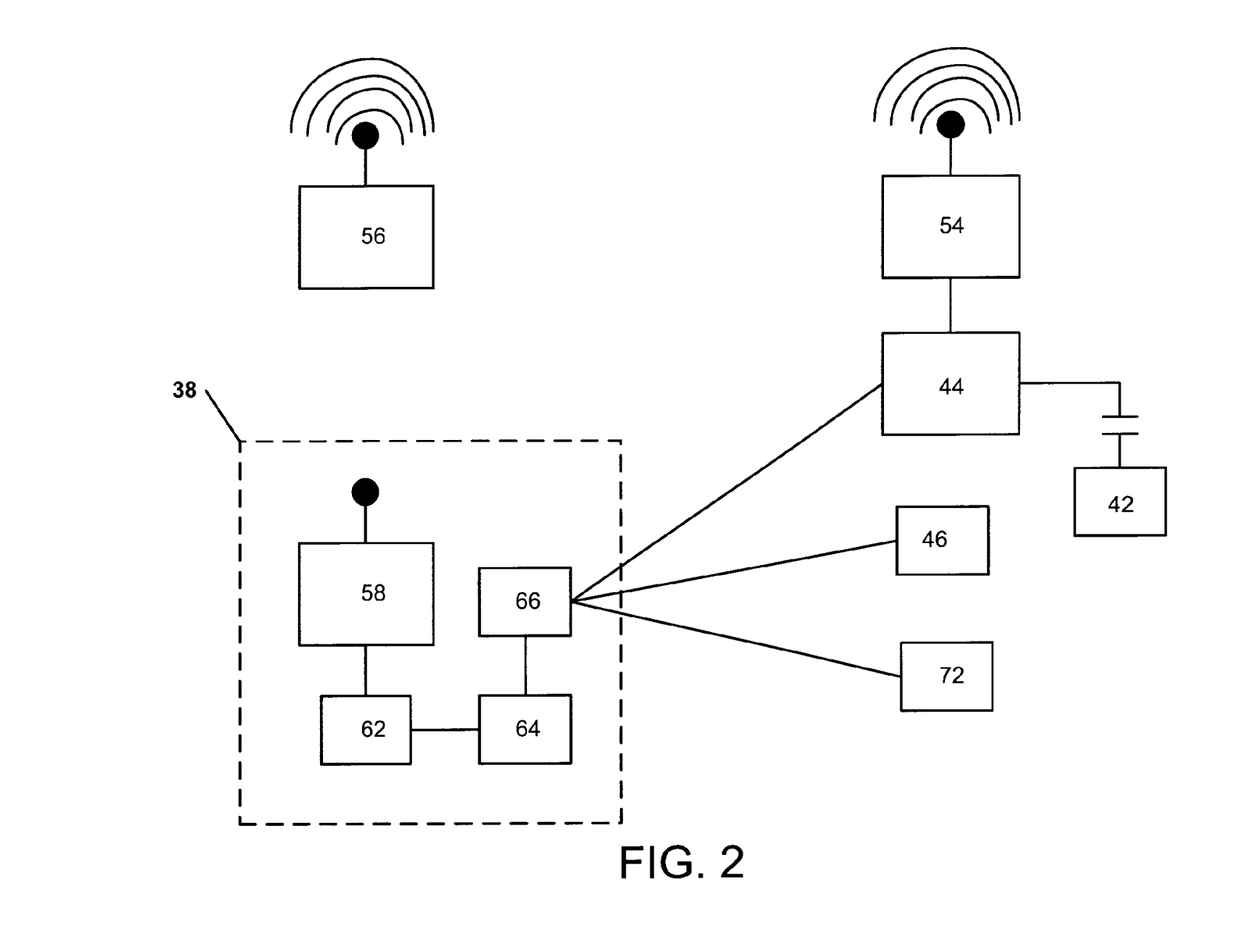
FIG. 2 is a schematic view of the various components of the present invention.

The encoded signal generated by 56 transponder is then received by an antenna 58 positioned within the compartment 38 of motorcycle 20. Antenna 58 is operatively interconnected to both a microprocessor 62 and memory 64, which are similarly positioned within compartment 38. Antenna 58, microprocessor 62 and memory 64 are preferably powered via the 12 VDC battery in the vehicle. Nonetheless, the use of a dedicated power source is also within the scope of the present invention. Memory 64 is used in storing one or more pre-determined identification signals.

In use, when antenna 58 receives identification signals from transponder 56, microprocessor 62 compares identification signals received with the pre-determined identification signals stored within memory 64. When a proper match is made, an enabling single is sent to a controller 66. In response to the enabling signal, controller 66 brings ignition 44 into the activated state. This, in turn, allows ignition 44 to be activated via push button 42. In the absence of a proper match, no enabling signal is sent and ignition 44 remains in the deactivated state.

Figure 4:
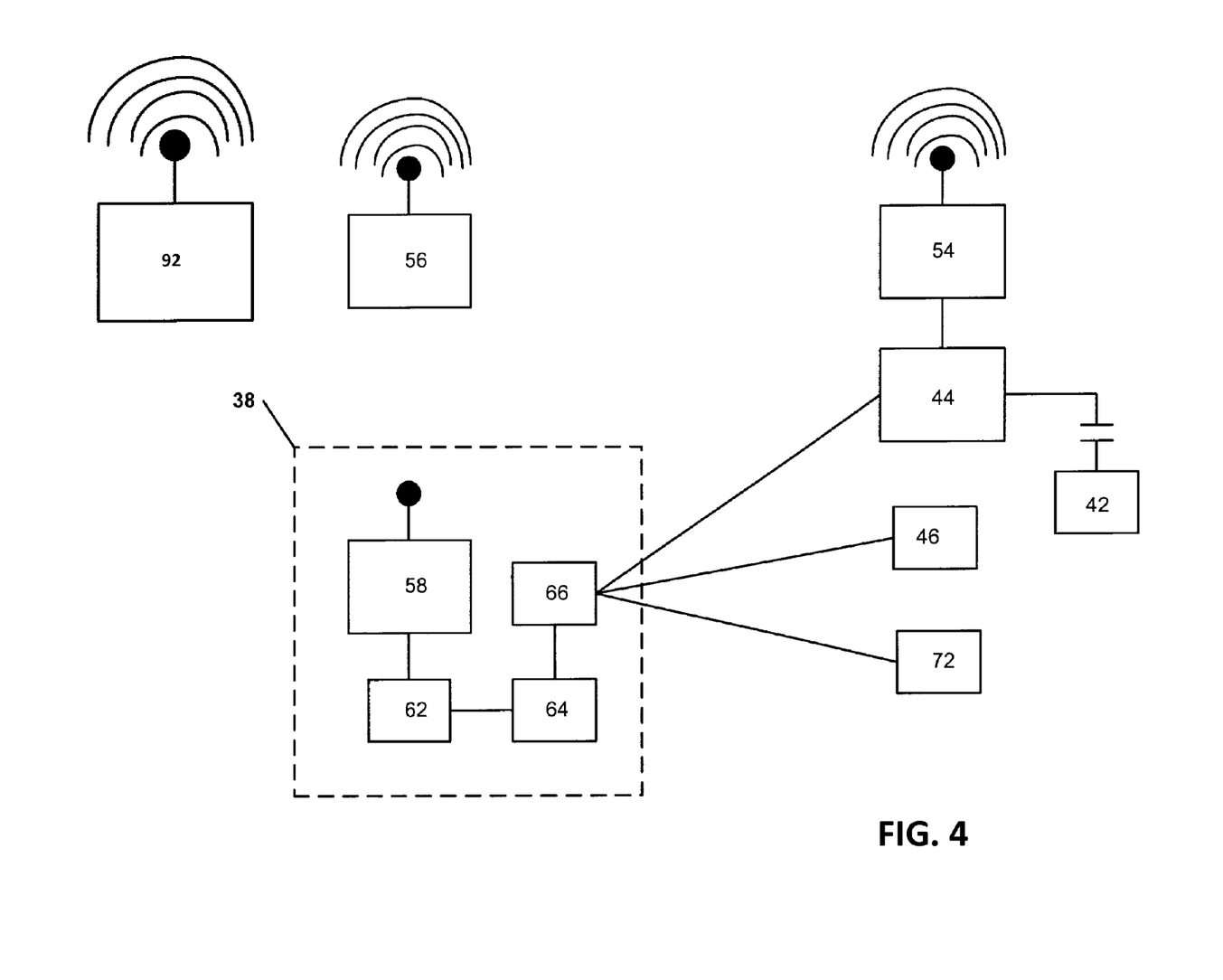
FIG. 4 is a schematic view of an additional embodiment of the present invention.

In a further embodiment depicted in FIG. 4, the pre-determined identification signal stored within memory 64 can be updated or changed via a programming means 92. In one non-limiting embodiment, the programming means comprises a programming signal sent by an authorized entity and received by antenna 58. This programming signal can be sent via a cellular telephone. Alternatively, memory 64 can be directly coupled to a data link to permit re-programming via a conventional land line or via the Internet. Changing the identification signal may be desired, for example, if the vehicle is being rented, in which case the identification signal can be changed to match a new transponder issued to a new operator. The vehicle may also include a Global Positioning Signal (GPS) receiver to permit the authorized entity to monitor or track the geographic location of the vehicle. It also permits the vehicle to be de-activated if it travels outside pre-determined geographic coordinates.

The enabling signal can also be used to deactivate anti-theft system 46. When deactivated, the wheel lock is brought into the unsecured state, whereby the locking bolt 48 is retracted so as to permit normal operation of motorcycle 20. Again, in the absence of a match between the identification signal received by antenna 58 and the identification signal stored in memory 64, the lock is maintained in its secured state and rotation of the handlebars 34 is prohibited.

Still yet other auxiliary devices can be operated by way of the controller. For example, in addition to anti-theft 46 and records keeping devices, the vehicle headlights 72 can also be operable in response to a positive ID match.

Thus, the present invention provides a method that will automatically recognize the operator 22 of a vehicle by matching an identification code emitted by a transponder 56 carried by an operator 22. This allows operation of the motor vehicle without the use of traditional keys and key switch devices. Namely, the invention provides communication back and forth between transponder 56 and vehicle 20, to determine if the identification code matches the vehicle stored identification code, thereby eliminating the need to locate a key and place it into a keyhole.

The system 10 utilizes a microprocessor 62 that is designed and pre programmed with intuitive logic and algorithms for communicating back and forth with the transponder 56, or other ID device, to ensure that the owner operator 22 is the only person allowed to activate the vehicle 20 and prepare it for operation. This, in turn, ensures that unwanted operators will continuously be eliminated and prevented from operating the vehicle 20.

The invention incorporates the internal 12 VDC power, or other power from the motor vehicle 20, to energize the microprocessor 62 and an associated controller 66, to permit the control of solenoid steering locks 48, ignition systems 44, anti-theft devices 46, safety inter-locks, and the starter motor whenever necessary to achieve a user friendly operation of vehicle 20.

The placement of the antenna 58 is critical to the proper function of this invention. Antenna 58 must be placed within, on, under, around or near the operator's seat 28 to be inconspicuous and allow an unobstructed field to radiate and receive energy to and from transponder 56. Other possible locations for antenna 58 include the gas tank or instrument pod, headlights, tail lights, or fenders.

The dual usage of the starter button 42 is also critical to the proper function and operation of this invention. Transmitter 54 is initiated by the operator when the operator presses starter button 42. When starter button 42 is depressed this initiates the search for the transponder 56 in possession of operator 22. If the transponder 56 is found, transponder 56 initiates an identification signal that is then received by antenna 58. If the ID of the transponder 56 matches the ID of the motor vehicle, the ignition 44 is activated. When activated, the starter button 42 an be used to operate the ignition system. In addition, starter button 42 can optionally control a steering lock 48 can be de-activated, additional burglar or anti-theft device can be de-activated, lights 72 can be activated, and other safety interlocks can be checked prior or during the operation of the starter.

Figure 3:
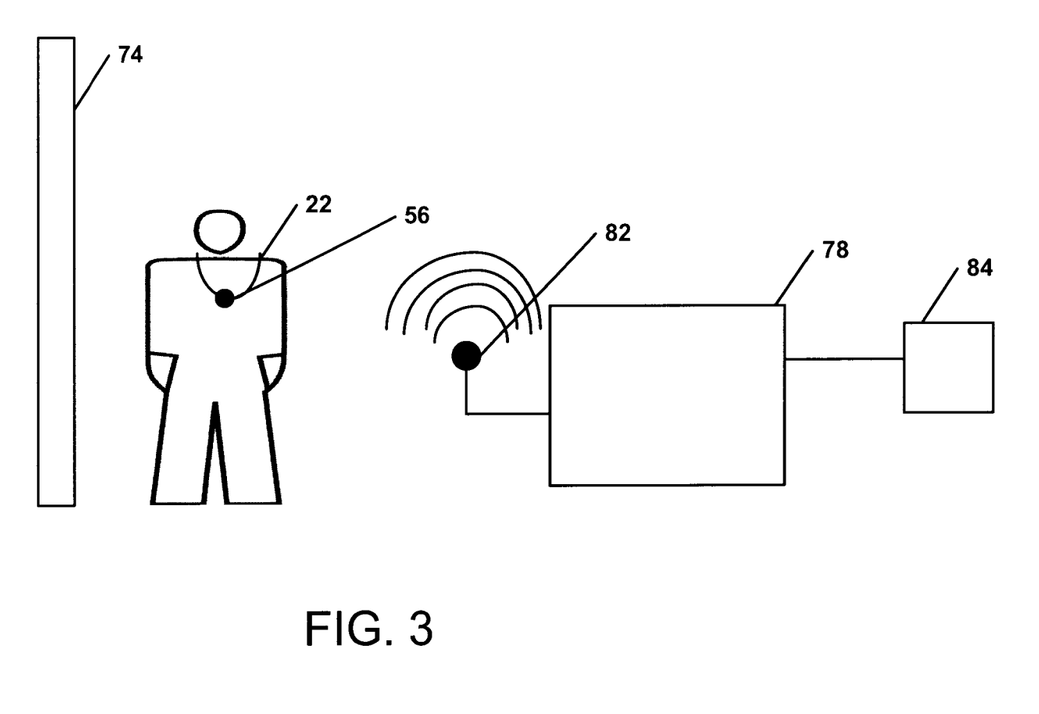
FIG. 3 is a schematic view of an alternative embodiment of the present invention.

The dual usage of the transponder 56 also forms an important part of the present invention. Namely, the transponder 56 is not only used to operate the vehicle 20, but it is also used by the vehicle dealership, service center, retailer or manufacturer to identify the owner at the time of service, parts and accessory purchases, and other activities where there is access to a computer. This feature of the present invention is illustrated in FIG. 3. In this embodiment, an antenna 74 is located in vertical panels on either side of the doorway to the showroom or service center. Antenna 74 could likewise be located in the floor adjacent a checkout counter. Antenna 74 continually sends out a triggering signal which is received by transponder 56 worn by a user 22 entering the showroom or service center. Alternatively, antenna 74 can be prompted by send out the triggering signal via a pressure sensitive switch or light beam adjacent the doorway.

Upon receiving the triggering signal, transponder sends out an identification signal for receipt by an antenna 82 at the service center counter 78. A microprocessor 84 at the service center counter 78 then determines whether identification signal matches the pre-determined identification signals stored within the memory of microprocessor 84. If a match is made, microprocessor unlocks the maintenance records associated with the vehicle of user 22. Personal information regarding user 22 can also be unlocked by this process. All of this data can be stored within memory of microprocessor 84. Unless a proper identification signal is received, this information is encoded within microprocessor 84 and otherwise inaccessible by service center personnel. In this manner, the present invention can be employed in building a rapport between the service center personnel and the customer.

Figure 5:
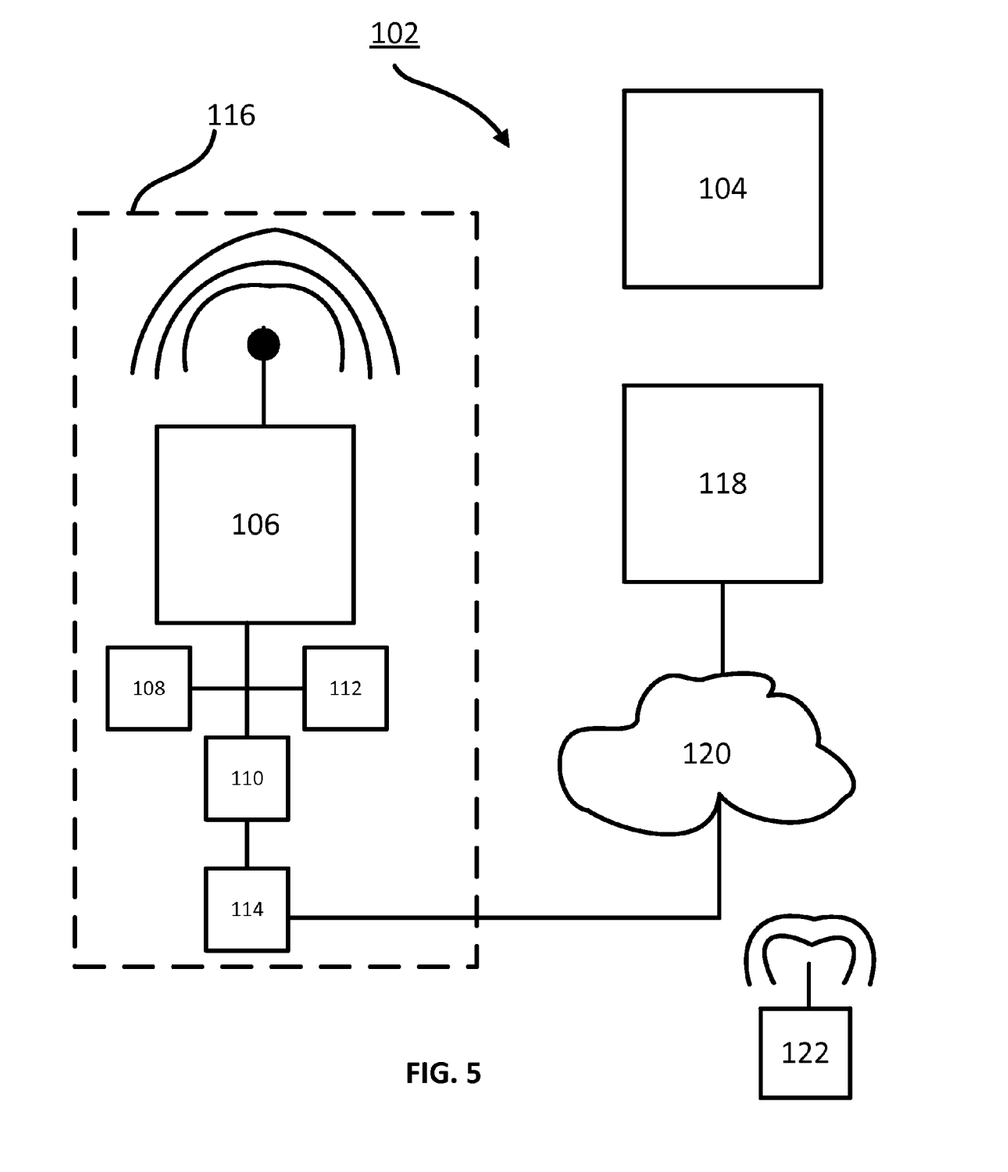
FIG. 5 is a schematic view of an additional embodiment using an RFID card and reader.

An additional embodiment of the present invention is illustrated in FIG. 5. This system 102 employs Radio Frequency Identification ("RFID") to selectively control the operation of a vehicle. More specifically, system 102 utilizes an RFID tag 104, which can take the form of a credit card or hotel key. RFID tag 104 emits a unique radio frequency code that can be read by a nearby RFID reader or interrogator 106. Reader 106 has a number of peripheral devices associated with it, including memory 108, a controller 110, a comparator 112, and a wireless modem 114. Reader 106 and its various peripheral devices (108, 110, 112, and 114) are preferably placed inside of a vehicle 116 that is intended to be controlled by system 102. Modem 114 is adapted to communicate with a base unit 118 over the Internet 120.

In use, memory 108 stores a database of RFID codes as well as rules governing treatment of different codes. Comparator 112 includes a microprocessor for comparing the RFID codes stored in memory 108 against the RFID code emitted by a nearby tag 104. More specifically, when a card 104 is brought into proximity of reader 106, the RFID code of card 104 is detected by reader 106. Thereafter, comparator 112 compares the detected code against codes stored in memory 108. Memory 108 can take the form of a flash memory or hard drive. When a match is detected between detected and stored codes, controller 110 permits operation of vehicle 116. For example, when comparator 112 detects a match, controller 110 an ignition switch is enabled to permit the user to start the engine. In the absence of a match, the ignition switch is not enabled and the vehicle 116 cannot be started.

Rules governing the usage of vehicle 116 can likewise be stored in memory 108. For example, the stored rules may dictate that the vehicle 116 can only be activated upon a match between the stored and detected codes and only within pre-defined date ranges. In another example, the stored rules may dictate that the vehicle 116 can only be operated upon a match between stored and detected codes and when the vehicle is within certain pre-defined geographic limits. In still yet another example, the vehicle will only operate upon a match and after payment has been accepted and processed. This latter example can be used within the context of a rental car agency.

The rules and RFID codes stored in memory 108 can be remotely updated via modem 114. As noted in FIG. 5, modem 114 communicates with a centralized base 118 via the Internet 120. The use of wireless communications are also within the scope of the present invention, such as limited area networks, wide area networks, and cellular networks. An administrator utilizing base 118 can remotely communicate with vehicle 116 to provide new updated RFID codes to memory 108. The administrator can also modify the rules governing operation of the vehicle 116. Vehicle records can also be accessed. System 102 thus permits an administrator to assign a new tag 104 to a user and thereafter update memory 108 with the unique code from the assigned tag 104. Users can also remotely access base 118 to get updates regarding the status of their tag 104. Base 118 can also access controller 110, via modem 114, to remotely operate vehicle 116. The following examples illustrate some possible uses of system 102.

Example 1

Charles rents a car regularly. Charles can now go on line to a rental car company's secure web site and provide all the information the company requires of its rental customers, i.e. in lieu of going to a rental location. This information can be completed on line without the need of a rental car company employee. No employee is aware of the customer's private information, this creates additional security. When this process is completed, the rental car company can mail or otherwise provide their client with a permanent RFID card key 104. This key 104 will provide access to certain authorized vehicles 116. One RFID card can be used to start any of the rental car company's vehicles 116 when authorized.

The rental company automatically, by computer software, can now authorize a specific RFID card 104 to remotely start a car or rental equipment 116. They may also be able to authorize a unit to work remotely by a single card 104, turn the vehicle 116 off so no one can use it, turn the vehicle 116 on so anyone can use it, or allow independent authorization from a dispatch office, and be able to remotely authorize the engine start in the event of a lost card or emergency.

Charles wants to fly into Dallas airport, rent a car, and fly out of Houston three days later. Charles goes on line and chooses a rental at the Dallas airport. The software would display the available cars, including pricing of any and all options etc. Charles remotely makes his reservation for a vehicle. The reserved vehicle 116, by way of rules downloaded into memory 108, knows at 10:00 am on his date of arrival Charles is allowed to start that specific car 116 with his RFID card 104. Charles may have to pass a secure entry to get into the space where the cars are kept. When the reservation is made, the assigned RFID card 104 will also act as a key for any security gates or access points 122 within the reservation area. Thus, once assigned, card 104 will permit entry through access gate 122. That same card 104 will also operate vehicle 116.

Charles arrived at the airport and picked up his car. The computer system knows exactly what time he picked his car up and begins billing against Charles pre-approved credit card submitted on line. Charles does his business and returns the car to the Houston airport. The rental company knows where it is, (at all times) and when he turns the car in, the billing to his account is completed.

Additionally, upon the return of vehicle 116, system 102 will inform all authorized personnel at the Houston location the cars service requirements prior to its return including all necessary parts. Charles's entire rental has been completed without standing in line or seeing a rental company employee.

Example 2

Charles has decided to buy a vehicle. The purchased vehicle 116 is part of system 102. When Charles purchases vehicle 116 his programming is automatically set up so he has access to base unit 118. He has his own logon name and password. By way of base unit 118, Charles can program additional keys 104. His vehicle 116 has the ability to have as many different keys 104 to start it as he would like.

Before Charles and his wife go out to dinner, he can access base unit 118 (either directly or wirelessly) to modify the stored rules. This gives him the ability to turn the vehicle 116 he left at home off so his kids cannot access it. Namely, Charles can establish a rule that even if an RFID match is made, the vehicle 116 ignition cannot be started. This can be a time triggered rule or a rule that is maintained until manually changed at a later time via accessing to base 118. He no longer has to give the valet at the restaurant his set of keys (usually with his trunk key or house key attached). He can hand him the valet card key 104 for the vehicle. If the vehicle 116 is subsequently stolen, new rules can be uploaded to memory 108 that will render the vehicle 116 useless.

Charles new car requires service very 3,000 miles. Without system 102, the dealer would guess when that service was needed and send him a postcard asking him to return to the dealer for service. The problem is that Charles had someone else do the service prior to the dealer sending out the postcard. The car dealer wasted his time and money sending the post card and probably lost the service now and in the future to the company that did the service. With the present system 102, the car dealer and the owner will get a notice in advance of the service requirement directly from the car. Namely, maintenance requests can be sent directly from vehicle 116 to base unit 118 via modem 114. The user can also be sent email reminders. Charles will also have an opportunity to respond to the notice and request an appointment at the car dealership. When the car service is complete the car dealer can go on line and sign off so that the history of the service for the car is kept accurately, increasing the value of the car at resale.

Example 3

I have been a Ford® guy all my life. I would bet a lot of money that a salesman (who I don't know) would love to know who I was when I walked in a showroom door. I bet he would like to know what cars I have purchased, and what and how I paid for them. If Ford® really cared about their dealers they would have a system that told them this information regardless of where that customer lived or came from. Dealerships that have system 102 working for them would know when a client who had a system card 104 in their wallet walked in the door. They could respond to someone they never met as if they were family. Namely, card 104 could be detected by a gate reader 122 when a customer entered a showroom. The code associated with card 104 can be read by gate reader 122 can used to identify the individual and their purchasing habits.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An ignition control system for a vehicle, the system permitting the vehicle to be started by the intended user only when pre-defined conditions are met, the pre-defined conditions being established by an administrator, the system comprising:
   an RFID tag emitting a unique RFID code, the RFID tag being carried by the intended user of the vehicle;
   a centralized base for permitting the administrator to establish the pre-defined conditions, the pre-defined conditions including detection of specific RFID codes, operation within specific date ranges, and operation within specific geographic boundaries;
   a vehicle including an ignition having an activated state and a deactivated state, the vehicle further comprising;
      an RFID reader for use in detecting nearby RFID codes;
      a memory with a database of stored RFID codes and pre-defined conditions;
      a comparator with a microprocessor for comparing RFID codes detected by the RFID reader with RFID codes stored within the memory;
      a controller for bringing the ignition into an activated state when a match is detected between the unique RFID code of the tag and one of the RFID codes stored within the memory and when the other pre-defined conditions are established;
      a wireless modem for use in communicating with the centralized base, whereby the stored RFID codes and pre-defined conditions can be updated via the wireless modem;
   a security gate with a RFID reader, the gate controlling access to the vehicle, the gate permitting access upon detecting the presence of the RFID tag.

2. An ignition control system for a vehicle, the system permitting the vehicle to be started by the intended user only when pre-defined conditions are met, the pre-defined conditions being established by an administrator, the system comprising:
   an RFID tag emitting a unique RFID code, the RFID tag being carried by the intended user of the vehicle;
   a centralized base for permitting the administrator to establish the pre-defined conditions;
   a vehicle including an ignition having an activated state and a deactivated state, the vehicle further comprising;
      an RFID reader for use in detecting nearby RFID codes;
      a memory with a database of stored RFID codes and pre-defined conditions;

a comparator with a microprocessor for comparing RFID codes detected by the RFID reader with RFID codes stored within the memory;

a controller for bringing the ignition into an activated state when a match is detected between the unique RFID code of the tag and one of the RFID codes stored within the memory and when the other pre-defined conditions are established.

3. The system as described in claim 2 wherein the vehicle further comprises a wireless modem.

4. The system as described in claim 3 wherein the wireless modem is for use in communicating with the centralized base.

5. The system as described in claim 4 whereby the stored RFID codes and pre-defined conditions can be updated via the wireless modem.

6. The system as described in claim 2 further comprising a security gate with a RFID reader.

7. The system as described in claim 6 wherein the gate permits access to the vehicle only upon detecting the presence of the RFID tag.

8. The system as described in claim 2 wherein the pre-defined conditions include operation of the vehicle within specific date ranges.

9. The system as described in claim 2 wherein the pre-defined conditions include operation within specific geographic boundaries.

10. The system as described in claim 2 wherein the pre-defined conditions include acceptance of payment terms.

* * * * *

UNITED STATES PATENT AND TRADEMARK OFFICE
CERTIFICATE OF CORRECTION

PATENT NO. : 8,477,020 B2  Page 1 of 1
APPLICATION NO. : 13/188522
DATED : July 2, 2013
INVENTOR(S) : Nick Ramirez and Reed W. Mapes It is certified that error appears in the above-identified patent and that said Letters Patent is hereby corrected as shown below:

In the Specification:

Col. 5, line 29, "transponder sends" should be "transponder 56 sends".

Signed and Sealed this
Thirteenth Day of August, 2013

Teresa Stanek Rea
*Acting Director of the United States Patent and Trademark Office*